(12) United States Patent
El-Taher

(10) Patent No.: US 9,156,613 B2
(45) Date of Patent: Oct. 13, 2015

(54) INSECT CONTROL WASTE RECEPTACLE LID

(71) Applicant: Todd El-Taher, Alexandria, VA (US)

(72) Inventor: Todd El-Taher, Alexandria, VA (US)

( * ) Notice: Subject to any disclaimer, the term of this patent is extended or adjusted under 35 U.S.C. 154(b) by 152 days.

(21) Appl. No.: 14/073,239

(22) Filed: Nov. 6, 2013

(65) Prior Publication Data

US 2015/0122813 A1 May 7, 2015

(51) Int. Cl.
*H02J 7/00* (2006.01)
*B65F 7/00* (2006.01)
*B65F 1/14* (2006.01)

(52) U.S. Cl.
CPC .............. *B65F 7/00* (2013.01); *B65F 1/1607* (2013.01); *B65F 2210/129* (2013.01); *B65F 2210/172* (2013.01)

(58) Field of Classification Search
CPC ......................................................... B65F 7/00
USPC ......................................................... 320/101
See application file for complete search history.

(56) References Cited

U.S. PATENT DOCUMENTS

| | | | | | |
|---|---|---|---|---|---|
| 3,840,145 | A | * | 10/1974 | Almanza | 220/87.1 |
| 4,242,311 | A | * | 12/1980 | Middaugh | 422/302 |
| 5,181,393 | A | * | 1/1993 | Lott | 62/264 |
| 2004/0033171 | A1 | * | 2/2004 | Kvietok et al. | 422/123 |
| 2006/0210421 | A1 | * | 9/2006 | Hammond et al. | 422/3 |
| 2010/0068092 | A1 | * | 3/2010 | Larsson | 422/5 |

* cited by examiner

*Primary Examiner* — Suchin Parihar
(74) *Attorney, Agent, or Firm* — Johnson Legal PLLC

(57) ABSTRACT

The invention is directed to the mitigation of nuisance insects, predominantly common flies and wasps, attracted to and gathering in discarded food, spills and related waste in garbage receptacles. A solar-powered, programmable or programmed dispenser of an aerosol agent releases the aerosol agent into the waste receptacle at selected intervals. The solar panel acts both as a power source and as a dusk-to-daylight sensor to turn the dispenser system off at night when insect populations are less troublesome but on in the morning to clear any accumulated insects and prepare the receptacle for use during the day. The dispenser system of the invention reduces the exposure of visitors to stings suffered by both patrons of a given establishment as well as the sanitation workers providing for a more enjoyable recreational experience and workplace.

10 Claims, 5 Drawing Sheets

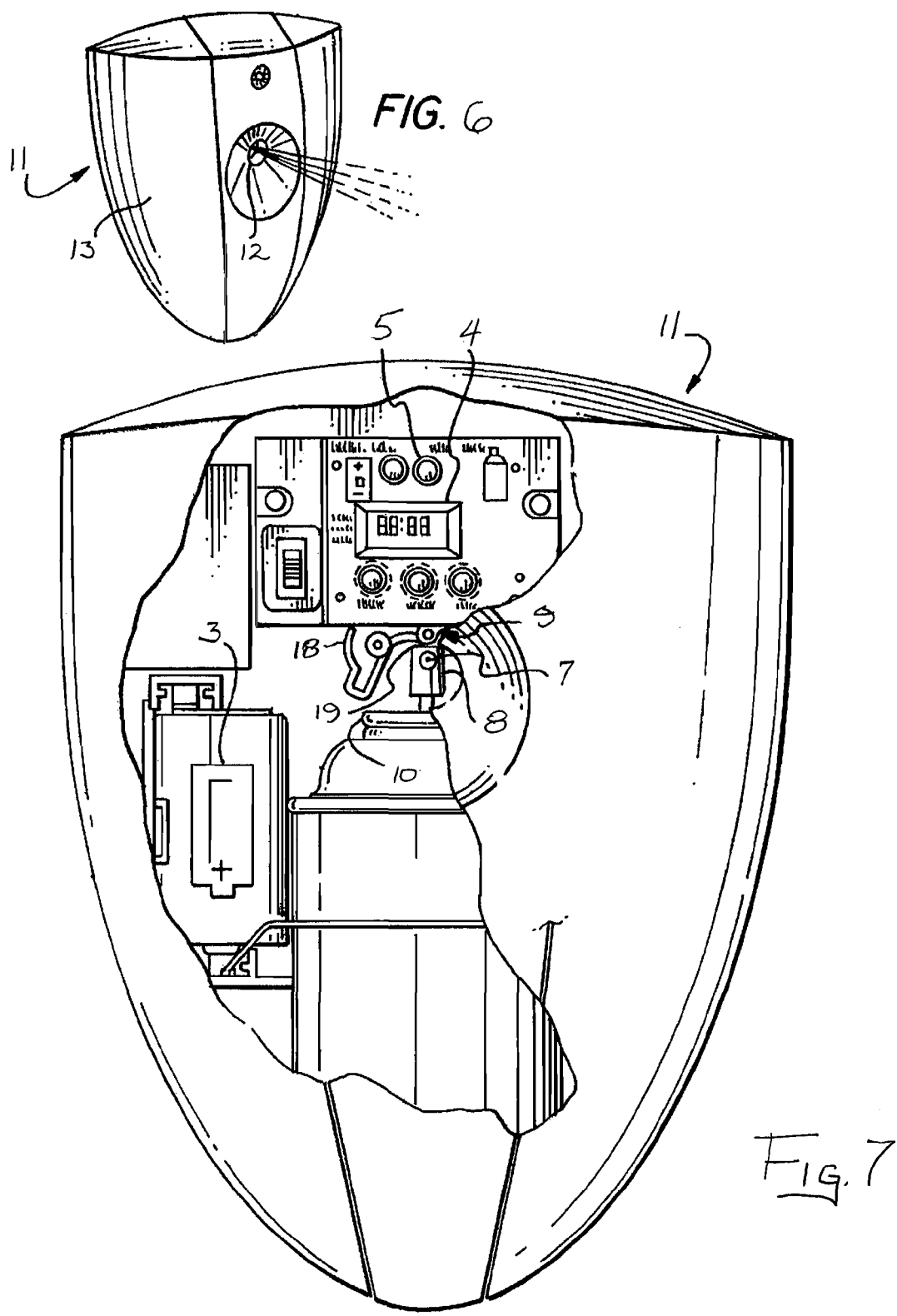

INSECT CONTROL WASTE RECEPTACLE LID

FIELD OF THE INVENTION

The invention relates to a waste receptacle having an automated dispenser mounted within a domed receptacle lid that can automatically dispense an aerosolized treatment into the receptacle on a designated schedule for controlling or repelling stinging insects.

BACKGROUND OF THE INVENTION

Waste receptacles are used outdoors and indoors in many places for the convenient control of casual waste. Such covers are generally open and unobstructed for convenient use, but they are also open for the emissions of scents, vapors and ingress by foraging insects in search of food. The unpleasant issues of odors and insects that become associated with such open waste containers often dictates the use of swing lids or doors to close the receptacle that can break, cause noise and pose maintenance issues to repair damaged doors.

It would be desirable to have a waste receptacle that could remain open and readily available for use but with some system within the cover that would be available to control insects and/or odors that might be attracted to waste within the receptacle.

SUMMARY OF THE INVENTION

It is an object of the invention to provide an open waste receptacle cover over a waste receptacle container and an aerosol-based treatment system within the cover that is sufficient to deter or repel insects attracted to waste within the container.

It is also an object of the invention to provide an aerosol dispensing system for a waste receptacle that would operate outdoors and without the need for an electrical power outlet connection.

In accordance with these and other objects of the invention that will become apparent from the description herein, a waste receptacle comprising an upper cover and a lower container, wherein said upper cover comprises: (a) a dispenser having a chamber dimensioned to receive a pressurized canister of an aerosol agent, (b) a displaceable member disposed to contact a nozzle on said pressurized canister, (c) a timer having an adjustable time duration between activation events and associated said displaceable member, (d) a battery electrically connected to said timer, and (e) a solar power cell electrically associated with and configured to recharge said battery upon exposure to solar energy and to discontinue dispensing operations of said dispenser at night.

The waste receptacle according to the invention provides a unique solution for caretakers of parks, playgrounds and other outdoor recreation areas where visitors, food-based waste and insects might all congregate. A solar-powered insect control system for a domed receptacle lid provides a system for controlling stinging and biting insects that might be attracted to waste within the receptacle and which might seek to establish nests or colonies within the enclosed top of the domed lid. Both of these events pose risks of injury for visitors who seek to use the waste receptacle and for maintenance crew who must open the domed lid to empty the collected waste. The insect control system of the present invention specifically addresses and neutralizes these potential threats with the adjustably periodic application of one or more aerosol agents that control or repel insect populations that are attracted to the waste or which mask the waste odors that attract such insects. The amount of applied aerosol is typically very small and the power required is similarly low. An aerosol canister will likely last 6-8 months of timed applications thereby providing control over an entire outdoor season for many regions.

BRIEF DESCRIPTION OF THE DRAWINGS

FIG. 6 is an outside view of a dispenser that can be used in the invention.

FIG. 7 shows additional details regarding a programmable timer that can be used in the invention.

DETAILED DESCRIPTION OF THE INVENTION

Figure 1:
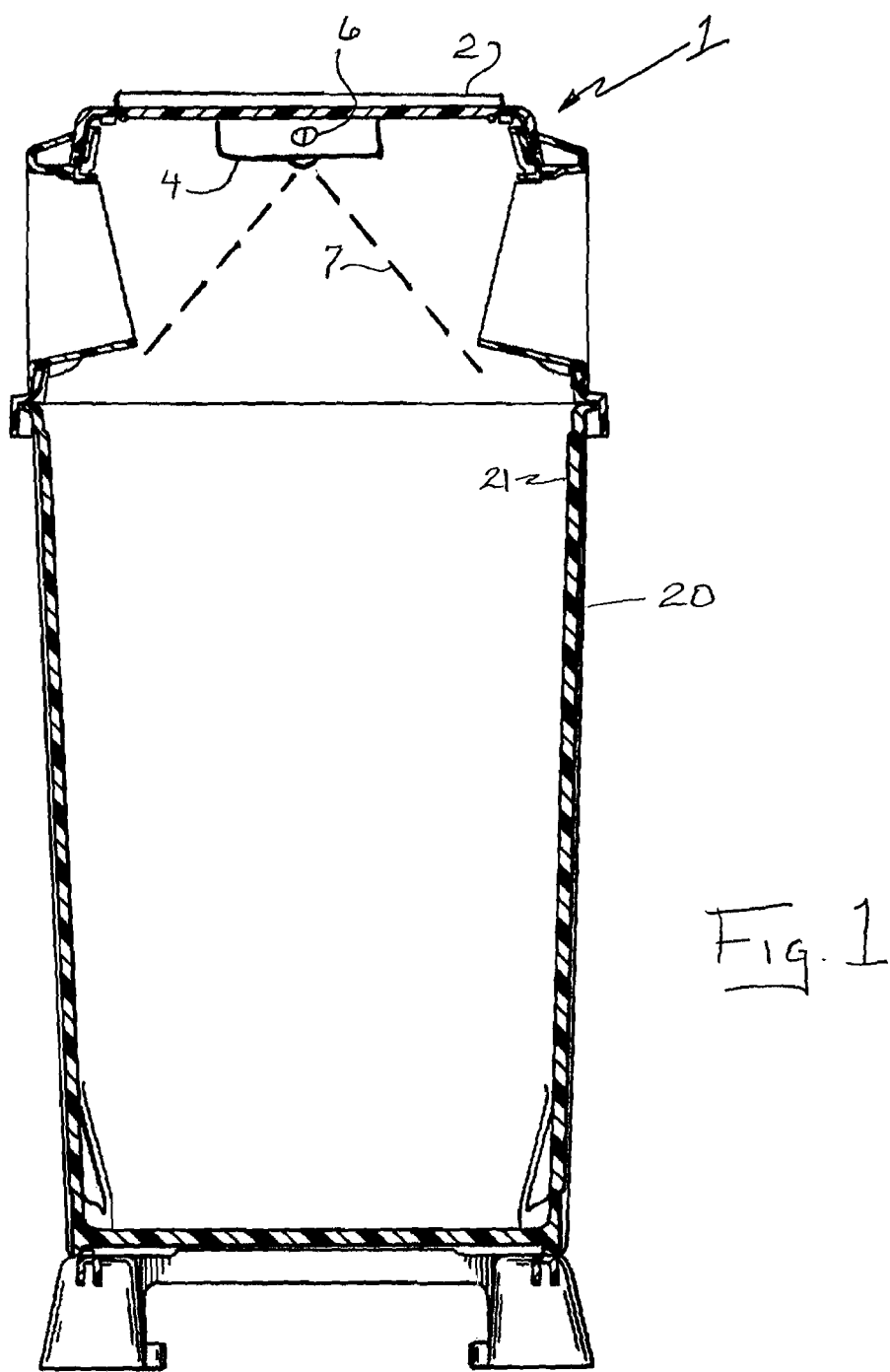
FIG. 1 is a side view of a domed waste receptacle cover according to a preferred embodiment of the invention showing an aerosol dispenser on the top underside of the cover.
Figure 2:
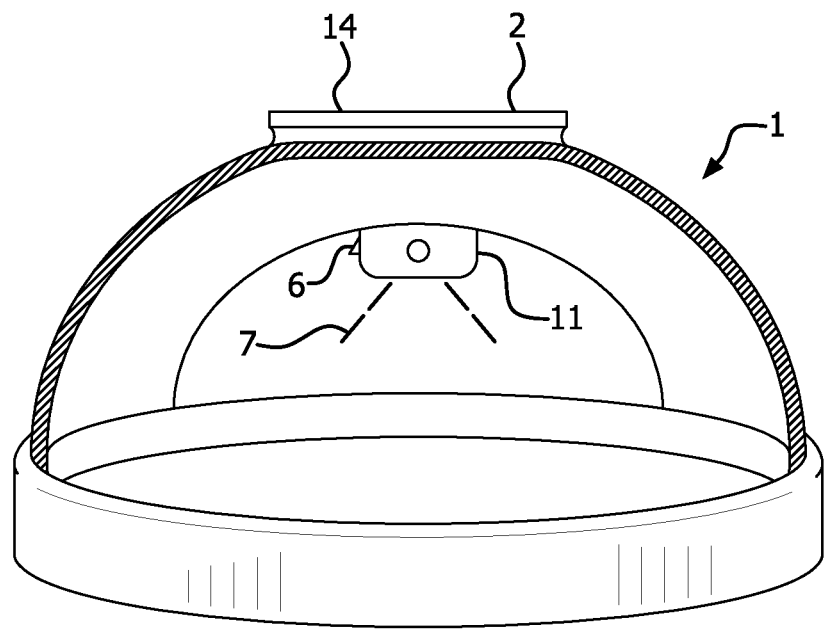
FIG. 2 is a view of a domed waste receptacle cover according to a preferred embodiment of the invention showing an aerosol dispenser on the top underside of the cover.
Figure 3:
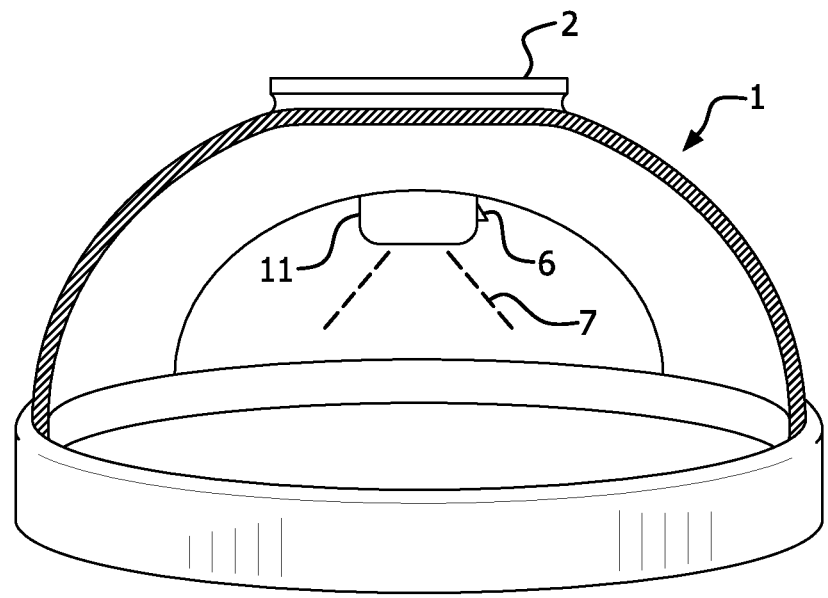
FIG. 3 is a front side view of a waste receptacle cover according to a preferred embodiment of the invention showing an aerosol dispenser on the top underside of the cover.
Figure 4:
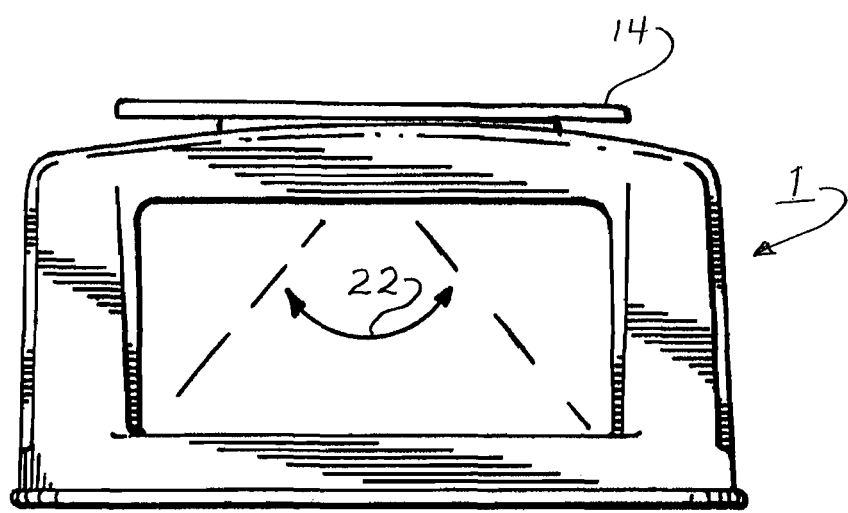
FIG. 4 is a rear side view of a domed waste receptacle cover according to a preferred embodiment of the invention.
Figure 5:
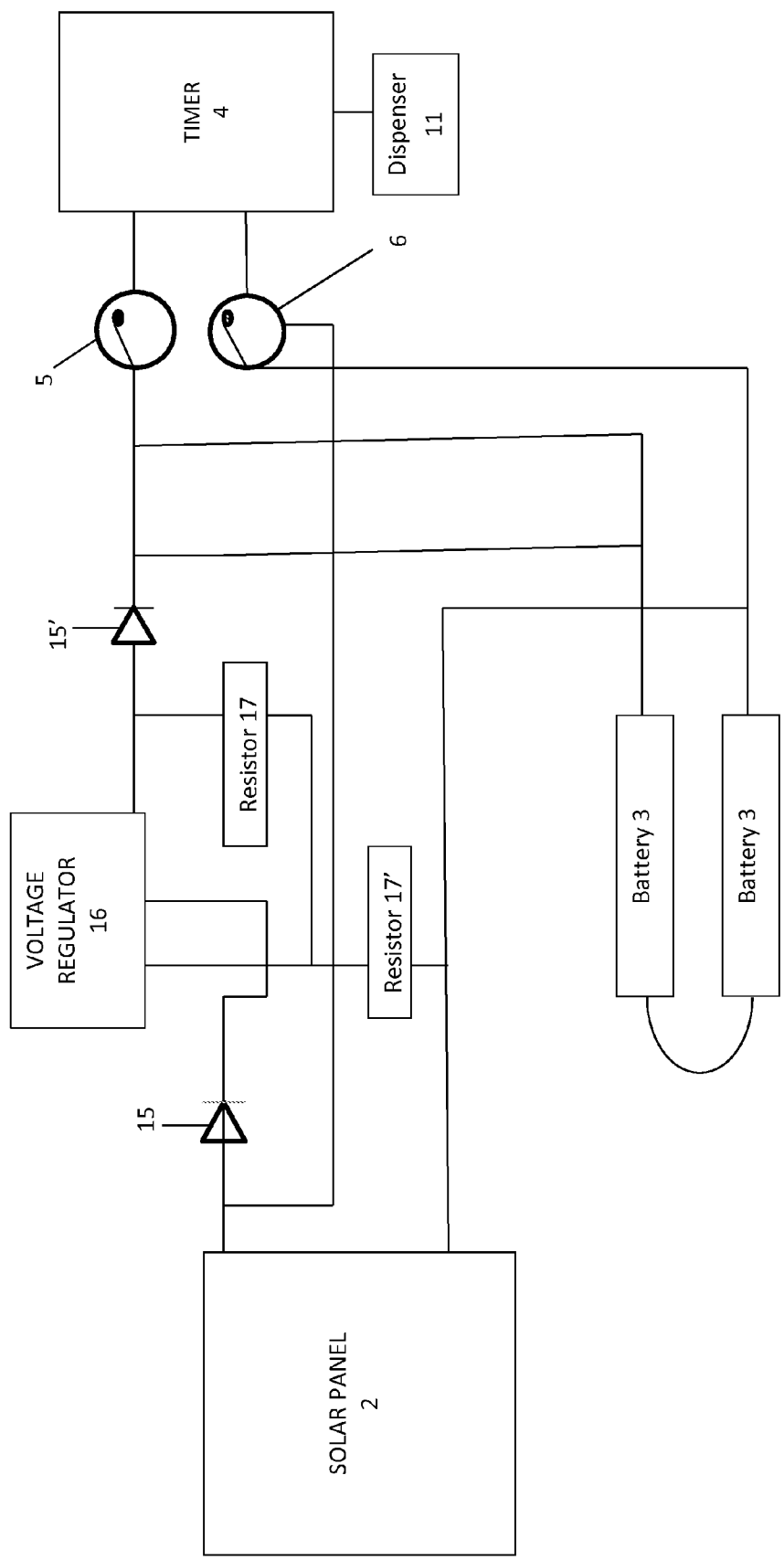
FIG. 5 is a schematic illustration of the circuitry for the dispenser.

The invention relates to waste receptacles, especially those with at least one uncovered opening in a lateral side of a domed receptacle lid, with a powered dispenser, preferably a battery and/or solar-powered dispenser, of an aerosol agent downwardly onto the top of the waste beneath that is within the receptacle. By selecting an aerosol agent that kills or repels insects that might be attracted to the waste in the receptacle, e.g., bees, wasps, hornets, flies and the like, the receptacle can be made safer for custodial staff who are charged with emptying the receptacles and for attendees who might want to dispose of refuse in the receptacle but who fear harm from stinging or biting insects that might be attracted to potential food sources within.

Preferably, the dispenser includes a timer for selecting or adjusting the spray interval and/or spray duration of the aerosol agent. Preferably, the interval length between sequential sprays is a time duration that is within the range from about 2 minutes to 12 hours. The specific interval selected will depend in large measure on the nature of the applied aerosol agents, its potency, mode of action and durability under the effects of potentially high cross wind currents through the receptacle enclosure and under the effects of potentially bright sun with little or no crosswind currents. Shorter intervals between applications will generally be used to apply larger quantities of the aerosol agent into the receptacle at the expense of shorter useful life for a given canister volume of aerosol agent. Longer intervals extend the life of the cartridge but potentially at the expense of the effective control of insects attracted to or remaining near the receptacle. Agents that operate as repellants due to odors may not require as short an interval between applications as insecticides that operate due to ingestion or contact of the target insect.

The applied aerosol agent is generally intended to control crawling or flying insects that might be attracted to waste within the container. Such agents would preferably work as insecticides that kill the insects by contact or ingestion, repellants that deter or actively repel foraging insects and/or masking agents that hide or neutralize the volatile emissions from waste within the receptacle. Preferred insecticides as the applied aerosol agent include natural, synthetic and organic insecticides and repellants for stinging and biting insects, such as flies, hornets, yellow jackets, wasps and the like. See U.S. Pat. Nos. 4,234,567, 4,904,464, and 8,394,358, The propellant can include, but is not limited to, nitrogen, carbon dioxide, nitrous oxide, hydrocarbons, such as propane, n-butane, isobutane, and hydrofluoroalkanese disclosures of which are hereby incorporated by reference.

Suitable synthetic insecticides can include active ingredients such as the pyrethrins such as the cyanopyrethroids (e.g., tetramethrin [3,4,5,6-tetrahydro-phthalidimomethyl (1RS) cis transchrysanthemate], cypermethrin [(RS)-alpha-cyano-3-phenoxybenzyl (1RS)-cis,trans-3-(2,2-dichlorovinyl)-2,2-dimethyl-cyclopropane carboxylate], sumethrin, resmethrin, tetramethrin, permathrin, and d-trans allethrin) or pyrethroids; carbamates such as 1-naphthyl N-methylcarbamate ("carbaryl") or propoxyur; piperonyl butoxide; ioxazoline derivatives such as those described in Published Application US 20130261069; or organo-phosphates like diazinon, chlorpyrofos, and dimethyl dichlorovinyl phosphate (DDVP); and mixtures thereof.

Suitable insect repellants include agents having a low human toxicity and preferably include one or more essential oils such as anise oil, castor oil, cedar oil, cinnamon oil, citronella oil, clove oil, corn oil, cottonseed oil, fennel seed oil, garlic oil, geranium oil, lavender oil, lemongrass oil, linseed oil, mint oil, patchouli oil, pennyroyal oil, peppermint oil, Roman chamomile oil, rosemary oil, sage oil, sesame oil, soybean oil, spearmint oil, thyme oil, wintergreen oil, and ylang ylang oil, or any combination thereof.

Odor masking agents that can be used as the applied aerosol agent for the present invention include a fragrance selected from the group consisting of: mint, pine, vanilla, citrus, floral, and any combinations thereof. Other types of masking agents include nanometer-sized dispersions of porous absorbents such as cyclodextrin, activated carbon, and the like.

One or more rechargeable batteries are preferably used to provide the required voltage and amperage to power the timing circuit of the dispenser and the armature used to activate the pressurized aerosol canister nozzle. Such batteries may be based on nickel-cadmium (Ni—Cd), nickel metal hydride (NiMH), lithium-metal-oxide, or any battery that is amenable to multiple recharging and discharging cycles over a period of at least many months. A solar cell atop or molded into the receptacle lid can preferably provide a substantially continuous recharging current for batteries used in the powered dispenser.

The domed receptacle cover is so called can be of virtually any shape, but preferably exhibits an open design without doors or movable flaps on the lateral sides or perimeter of the lid that obstruct use of the receptacle. Such designs are often used outdoors and in public places where high volumes of visitors occur in warm seasons. See, e.g., US D271248, D312523 and D335565, the disclosures of which are hereby incorporated by reference.

The receptacle cover of the present invention may be molded into the domed housing, fastened thereto or configured with mating parts that connect through the top of the domed receptacle cover. For relatively flat, dome lids may be modified with an opening in the top of the lid to receive a dispenser according to the invention from a threaded connector extending upwardly through the opening and into threaded engagement with a corresponding, mated thread connection attached to a solar cell from above the lid. This passageway provides a passage into which the dispenser, solar cell and/or additional components may be placed and thereby shorten the length to which the dispenser and/or solar cell extends above the relevant surface of the receptacle cover. Alternatively, a relatively small opening can be used to route wires between the solar cell and the dispenser inside the receptacle cover.

The invention is conveniently described with reference to the attached figures. The same reference number is used to denote the same structure in the several views.

The receptacle cover 1 uses a solar panel 2 as a solar-based trickle charger to recharge a rechargeable battery 3 that powers DC-based timer 4 and aerosol dispensing system 11. The solar panel 2 also activates (or deactivates) a switch 5 to toggle the timer 4 into (or from) a dawn-to-dusk mode that operates during daylight but prevents dispensing the aerosol agent 7 at night which could potentially waste the aerosol agent, e.g., an aerosol insecticide, when insects are no longer active and visitors are no longer around. Switch 5 may also incorporate a tilt switching system to disconnect power when cover 1 is tipped upright such as when opened for emptying the waste receptacle 20. A manual service switch 6 is also used to disconnect dispenser 4 from power to permit servicing of insecticide canister, dispenser mechanism and removal of waste. As with switch 5, switch 6 may also incorporate a tilt switching system to disconnect power when cover 1 is tipped upright such as when opened for emptying the waste receptacle 20.

The aerosol agent 7 is dispensed when nozzle 8 is depressed, deflected or axially displaced by the movement of armature 9, e.g., in a direction towards pressurized canister 10. Spray opening 12 in dispenser housing 13 guides the ejected aerosol into the waste receptacle while protecting the operational mechanisms of dispenser 11. Housing 13 is preferably hinged for opening to replace canister 10.

The solar panel 2 is preferably a 5v 1030 mA panel encased in a Lexan polycarbonate waterproof housing 14, charging one or more batteries 3, preferably a pair of 1.5v Ni—Mh batteries. Panel 2 is protected from reverse current by a 1N914 switching diodes 15 and 15'. The one or more batteries 3 are protected from overcharging by, e.g., an LM317T regulator 16 and resistors 17 and 17' having, e.g., ratings of 240 ohms and 10 ohms, respectively.

The aerosol dispenser used in the preferred embodiment of the invention is preferably the same as or similar to a commercially available restroom air freshener. See, e.g., U.S. Pat. Nos. 3,018,056, 3,195,777, 3,351,240, 3,546,479, 3,589,562, 3,837,532, 6,267,697 and published application US 20110283447, the disclosures of which are hereby incorporated by reference. Such designs are compact, mount readily under a wide variety of existing receptacle covers, and already include a battery-operated timing system that allows the user to select or adjust the time interval between sprays, e.g., at 9 minutes, 18 minutes and 36 minutes. The longer intervals will typically allow a single canister of 10-12 fluid ounces of aerosol agent to be used for up to 6-8 months when used according to the invention, i.e., turned off at night and subject to a timed application interval of 1-1000, preferably 1-100 and most preferably 1-2 nl per spray.

The canister of pressurized aerosol agent can be of any type of agent or combination of agents, including toxic insecticides, insect repellants, pheromones that repel insects, and essential oils that repel insects or which mask odors from the waste contained within the receptacle. The application rate and frequency of a particular aerosol agent will depend in large measure on the identity, amount, concentration, and spray duration of the selected agent. For example, a canister of 12 fluid ounces (355 ml) will expel about 1.6 nl of fluid for every timed activation and thereby last 6 months when operated 12 hours per day at a 36 second interval period.

The outlet nozzle of the pressurized aerosol agent canister is preferably activated by some type of movement or deformation of the canister nozzle 8 which then releases an aerosol of the agent under pressure within canister 10. Because the timer will again activate the release in a relatively short span of time, only a short burst or brief period of aerosol release is usually needed or desirable, i.e., within 1-1000 nl per spray. Suitable mechanisms that might be associated with the timer include a cammed arm 18, an eccentrically-geared or moving arm member 19, and an axial displacement that depresses the canister nozzle.

The size and shape of the spray nozzle 8 used in dispenser 11 can be used to control both the spread angle 22, droplet size and volume of dispensed aerosol agent. In general, a desirably droplet size is sufficiently large to fall downwardly into waste receptacle 20 under the effects of a crosswind through the lid openings at the average wind velocity for the region. Droplets that are too small will be carried out of the lid and have a much reduced effect on the local insect population that might be within the receptacle 20. Droplets that are too large will fall too quickly and fail to be expelled radially outwardly to a distance sufficient to reach the inner walls 21 of receptacle 20. The nozzle size and effective spread pattern are similar: too narrow and the expelled liquid acts as a stream that may not adequately reach the perimeter areas inside the receptacle.

What is claimed is:

1. An open waste receptacle suitable for use in an outdoor recreational area which includes a domed, upper receptacle cover and a lower waste container that is covered by said upper receptacle cover, wherein said upper receptacle cover exhibits at least one uncovered opening in a lateral side of said receptacle cover that provides access to said lower container, said receptacle cover further comprising:
    (a) a dispenser having a chamber dimensioned to receive a pressurized canister of an aerosol agent comprising an insecticide, an insect repellant, or a dispersion of nanometer-sized masking agent, said dispenser being directed to dispense said aerosol agent downwardly onto waste in said lower waste container,
    (b) a displaceable member disposed to contact a nozzle on said pressurized canister,
    (c) a timer having an adjustable time duration between activation events and connected to actuate said displaceable member upon an activation event,
    (d) a battery electrically connected to said timer, and
    (e) a solar power cell electrically associated with and configured to recharge said battery upon exposure to solar energy and to discontinue dispensing operations of said dispenser at night.

2. A waste receptacle according to claim 1 wherein said timer has an adjustable duration between activation events that is within the range from about 2 minutes to about 12 hours.

3. A waste receptacle according to claim 1 wherein the dispensed insecticide kills insects by contact.

4. A waste receptacle according to claim 1 wherein the dispensed aerosol agent comprises an insect repellant that comprises a pheromone repellant or one or more essential oils selected from the group consisting of anise oil, castor oil, cedar oil, cinnamon oil, citronella oil, clove oil, corn oil, cottonseed oil, fennel seed oil, garlic oil, geranium oil, lavender oil, lemongrass oil, linseed oil, mint oil, patchouli oil, pennyroyal oil, peppermint oil, Roman chamomile oil, rosemary oil, sage oil, sesame oil, soybean oil, spearmint oil, thyme oil, wintergreen oil, and ylang ylang oil.

5. A waste receptacle according to claim 1 wherein the dispensed dispersion of nanometer-sized masking agent comprises cyclodextrin or activated carbon.

6. A waste receptacle according to claim 1 wherein said domed receptacle lid exhibits an open design without doors or movable flaps on lateral sides or perimeter of the lid that obstruct discard of waste into said lower waste container.

7. A waste receptacle according to claim 1 further comprising a switch between the battery and the displaceable member that disconnects power to said displaceable member and thereby allow servicing of the receptacle.

8. A waste receptacle according to claim 7 wherein said switch is manually activated.

9. A waste receptacle according to claim 7 wherein said switch is a tilt switch that disconnects power when the receptacle cover is tipped upright.

10. A waste receptacle according to claim 1 wherein the dispensed aerosol exhibits a droplet size sufficiently large to fall into said lower container and past any openings in said receptacle cover under the effects of crosswinds through said openings at an average wind velocity for a region where said receptacle is located.

* * * * *